Patented Mar. 20, 1951

2,545,821

UNITED STATES PATENT OFFICE 2,545,821

METHOD OF REDUCING REFRACTORY OXIDES

Thayer Lindsley, New York, N. Y., and Peter P. Alexander, Beverly, Mass., assignors to Metal Hydrides Incorporated, Beverly, Mass., a corporation of Massachusetts No Drawing. Application September 10, 1948, Serial No. 48,772

2 Claims. (Cl. 75—84)

The present invention relates to a method for reducing chromium oxide to obtain chromium metal substantially free of hydrogen.

Most of the commonly available refractory oxides, such as chromium oxide, titanium oxide and zirconium oxide, can be reduced by heating an intimate mixture of the finely divided oxide and a reducing agent, such as calcium hydride. In accordance with this method, the finely divided mixture of the refractory oxide and calcium hydride is placed in a suitable crucible in a furnace and the furnace subjected to vacuum while heating to a temperature between 675° C. and 1000° C. whereby the refractory oxide is reduced to the corresponding metal and the calcium hydride is converted to calcium oxide. After this mixture is removed from the crucible, the calcium oxide is removed by leaching the mixture with a dilute acid, such as hydrochloric acid, to recover the reduced metal. Certain metals, such as chromium, produced in this manner tend to take up hydrogen from the acid leach and become brittle. The mixture of reduced metal and calcium oxide clings to the crucible but it may be removed by chiselling.

The present invention contemplates a method for reducing chromium oxide to obtain chromium metal substantially free of hydrogen. The invention is based upon the discovery that if chromium oxide is reduced with lithium hydride to form chromium metal and lithium oxide and the lithium oxide is removed from the reduction product by leaching with water, the reduced metal does not take up hydrogen and can be recovered in ductile form. While we prefer to employ lithium hydride, it may be replaced by other reducing agents the oxide of which is water soluble, such as a hydride of another alkali metal.

In addition to the markedly improved quality of the chromium metal produced, the present invention possesses the added important advantage that the by-product, lithium oxide, which is converted to lithium hydroxide during leaching, can be recovered and easily reconverted to lithium hydride for reuse thereby lowering the cost of the reducing agent. Thus, the water solution of lithium hydroxide may be evaporated to recover solid lithium hydroxide, or carbon dioxide may be bubbled through the solution to precipitate lithium carbonate. The solid lithium hydroxide in anhydrous form may be reduced with a low cost reducing metal, such as magnesium, silicon or aluminum, to obtain lithium hydride directly as described in the patent to Peter P. Alexander No. 2,450,266, dated September 28, 1948. The lithium carbonate may be reduced to lithium metal with a low cost reducing metal, such as silicon, and the lithium distilled and hydrided after condensation in a cooler part of the retort as described in the patent to Peter P. Alexander No. 2,408,748, dated October 8, 1946.

While the invention contemplates the reduction of chromium oxide with any suitable reducing agent capable of producing a reduction product comprising a mixture of the reduced metal and a water soluble metal oxide, we prefer to employ lithium hydride as the reducing agent. Thus, in accordance with our preferred practice, small self sustaining briquettes are formed by subjecting an intimate finely divided mixture of lithium hydride and chromium oxide to heavy pressure in the order of 10 to 50 tons per square inch. These briquettes are placed in a crucible and the crucible placed in a suitable furnace. The furnace is connected to a vacuum pump and its temperature gradually increased. The lithium hydride becomes liquid at 680° C. and coats all the particles of refractory oxide before the reducing reaction starts. The briquettes contract but do not disintegrate. As the temperature is increased to, between 800° to 900° C. the reaction proceeds to completion as represented by the equation.

$$Cr_2O_3 + 6LiH \rightarrow 2Cr + 3Li_2O + 3H_2$$

A higher temperature may be used if desired to hasten the reaction. The temperature may be controlled easily since the reaction is only slightly exothermic. The reduction products do not stick to the crucible and may be easily removed. This is an important advantage in contrast with those of chromium and calcium oxide which must be chiselled out of the crucible.

Since lithium oxide is water soluble it may be removed from the reduction products by leaching the latter with water to form a water solution of lithium hydroxide. The reduced metal, when recovered by leaching with water, does not take up hydrogen and oxidation may be avoided by drying at a low temperature. The lithium may be recovered easily from the lithium hydroxide solution as previously described for re-use in the reduction of refractory oxides.

Illustrative examples of other refractory oxides which may be reduced by the practice of the invention are the oxides of beryllium, boron, zirconium, uranium, tantalum, etc. The invention also is applicable for the production of finely divided powdered alloys with the same resulting advantages. Thus, by heating the refractory oxide with lithium hydride in the presence of at least one other element or metal, such as nickel, cobalt, etc., which alloys more readily with the metal of the refractory oxide than with the metal of the reducing agent, alloys of the metal of the refractory oxide and such other element may be formed. In this manner, such valuable alloys as those of beryllium, chromium etc. with nickel, cobalt, etc. may be produced in a form convenient for fabrication. Alloys also may be produced of nickel, cobalt, etc. with metals of refractory oxides, such as titanium, thorium, etc. which either are difficultly reducible or only partially reduced by lithium hydride alone. In the latter instances the other element or metal, such as nickel, cobalt, etc., appears to act as a "getter" and aids the reducing action and allows it to proceed to substantial completion. The amount and subdivision of such other element preferably is such that the number of particles thereof exceeds the number of particles of the refractory oxide in the charge. The selection of such additional reagent in each instance will depend upon its known relative capacities to alloy with the metal of the reducing agent and the metal of the refractory oxide and also will depend upon the final product desired.

In many instances the additional agent initially may be in the form of a metal oxide, such as nickel oxide, which can be reduced with hydrogen. Thus, a charge consisting of a finely divided intimate mixture of the refractory oxide and nickel oxide may be placed in a substantially gas tight furnace. Hydrogen gas is introduced and the furnace heated to about 250° C. until the nickel oxide has been reduced. The reducing agent, such as lithium hydride, is intimately mixed with the charge and the mixture, in the form of briquettes or otherwise, is heated under the conditions previously described to effect reduction of the refractory oxide. The heating may be continued to assure uniform diffusion of the nickel into the reduced metal of the refractory oxide.

We claim:

1. The method of producing chromium substantially free of hydrogen which comprises forming an intimate finely divided mixture comprising chromium oxide and an alkali metal hydride, heating said mixture to form a reduction product comprising chromium and the water soluble oxide of the alkali metal, and leaching the reduction product with water to remove the water soluble oxide thereby obtaining chromium substantially free of hydrogen.

2. The method of producing chromium substantially free of hydrogen which comprises forming an intimate finely divided mixture comprising chromium oxide and lithium hydride, heating said mixture to form a reduction product comprising chromium and lithium oxide, leaching the reduction product with water, and separately recovering the chromium and a water solution of lithium hydroxide.

THAYER LINDSLEY.
PETER P. ALEXANDER.

REFERENCES CITED

The following references are of record in the file of this patent:

UNITED STATES PATENTS

| Number | Name | Date |
| --- | --- | --- |
| 2,038,402 | Alexander | Apr. 21, 1936 |
| 2,287,251 | Jones | June 23, 1942 |
| 2,287,771 | Alexander | June 30, 1942 |
| 2,450,266 | Alexander | Sept. 28, 1948 |

FOREIGN PATENTS

| Number | Country | Date |
| --- | --- | --- |
| 503,874 | Great Britain | Apr. 17, 1939 |

OTHER REFERENCES

Powder Metallurgy by Wulff, published 1942 by A. S. M., Cleveland, Ohio, pages 145 and 154.

Chapters in the Chemistry of the Less Familiar Elements by Hopkins: Stirpes Publishing Co. Champaign, Ill., vol. 1, chap. 2, page 8.

Chemical Engineer's Handbook by Perry, published 1941 by McGraw Hill, N. Y., 2nd edition, pages 323 and 327.